(12) United States Patent
Maki et al.

(10) Patent No.: US 10,036,346 B2
(45) Date of Patent: Jul. 31, 2018

(54) LUBRICATION CIRCUIT AND METHOD OF FORMING

(71) Applicant: Ford Global Technologies, LLC, Dearborn, MI (US)

(72) Inventors: Clifford E. Maki, New Hudson, MI (US); Antony George Schepak, Howell, MI (US); Mathew Leonard Hintzen, Stockbridge, MI (US); Mark W. Thibault, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/850,059

(22) Filed: Sep. 10, 2015

(65) Prior Publication Data

US 2017/0074205 A1 Mar. 16, 2017

(51) Int. Cl.
  *B22C 9/10* (2006.01)
  *B22C 9/24* (2006.01)
  (Continued)

(52) U.S. Cl.
  CPC .............. *F02F 1/20* (2013.01); *B22C 9/043* (2013.01); *B22C 9/108* (2013.01); *B22C 9/24* (2013.01); *B22D 17/00* (2013.01); *B22D 19/0009* (2013.01); *B22D 19/0072* (2013.01); *B22D 21/007* (2013.01); *B22D 25/02* (2013.01); *B33Y 80/00* (2014.12); *F01M 11/02* (2013.01); *F01M 2011/026* (2013.01)

(58) Field of Classification Search
  CPC ........... B22C 9/043; B22C 9/10; B22C 9/108; B22C 9/24; B22D 17/00; B22D 21/007; B22D 25/02

USPC ............................... 164/30, 31, 32, 132, 369
See application file for complete search history.

(56) References Cited

U.S. PATENT DOCUMENTS

| | | | | |
|---|---|---|---|---|
| 4,774,990 A | * | 10/1988 | Yamamoto et al. | ...... B22C 3/00 164/132 |
| 4,905,750 A | * | 3/1990 | Wolf | ....................... B22C 9/106 164/132 |

(Continued)

OTHER PUBLICATIONS

Pierri, "Lost Core, New Perspectives in Die Casting", Bühler AG, 2012, 20 pages.

(Continued)

*Primary Examiner* — Kevin P Kerns
(74) *Attorney, Agent, or Firm* — Brooks Kushman P.C.; Julia Voutyras

(57) ABSTRACT

An engine has a cylinder block formed by a block material and defining at least one cylinder. The block defines a lubrication circuit with fluid passages including an inlet passage, a main oil gallery, a crankshaft bearing lubrication passage, and a piston ring lubrication passage. The fluid passages are formed by continuous metal walls in contact with and surrounded by the block material. At least one of the fluid passages is curved. A method of forming a component with an internal pressurized lubrication circuit includes positioning a lost core insert in a tool, with the insert shaped to form a lubrication circuit. The lost core insert has a lost core material generally encapsulated in a continuous metal shell, and at least one curved section. Material is provided into the tool to form a body surrounding the lost core insert thereby forming a component preform.

14 Claims, 5 Drawing Sheets

(51) Int. Cl.

| | |
|---|---|
| *B22C 9/04* | (2006.01) |
| *B22D 17/00* | (2006.01) |
| *B22D 21/00* | (2006.01) |
| *B22D 25/02* | (2006.01) |
| *F02F 1/20* | (2006.01) |
| *B33Y 80/00* | (2015.01) |
| *B22D 19/00* | (2006.01) |
| *F01M 11/02* | (2006.01) |

(56) References Cited

U.S. PATENT DOCUMENTS

| | | |
|---|---|---|
| 7,921,555 B2 | 4/2011 | Benz et al. |
| 2008/0135202 A1* | 6/2008 | Lee et al. ............... B22C 9/101 164/28 |
| 2011/0120299 A1 | 5/2011 | Aro |
| 2014/0102656 A1* | 4/2014 | Propheter-Hinckley et al. ............................... B22C 9/04 164/34 |
| 2016/0040621 A1* | 2/2016 | Beyer et al. ........... B22D 17/00 123/193.1 |

OTHER PUBLICATIONS

Heppes, "Stable Filled Aluminum Tubes for Foundries Near End Outline Casting With Remarkable Material Savings", Drahtzug Stein combicore, 27 pages.

* cited by examiner

US 10,036,346 B2

LUBRICATION CIRCUIT AND METHOD OF FORMING

TECHNICAL FIELD

Various embodiments relate to a lubrication system in an internal combustion engine, and a method of providing the system.

BACKGROUND

Internal combustion engines have various components that move relative to one another. These components may require lubrication to reduce friction and wear between the components. The lubrication process may also provide for at least some cooling of the engine and the rotating components. The engine may include internal lubrication passages, or a lubrication circuit, to direct lubricant to the various desired locations within the engine.

SUMMARY

According to an embodiment, an engine is provided with a cylinder block formed by a block material and defining at least one cylinder. The block defines a lubrication circuit with fluid passages including an inlet passage, a main oil gallery, a crankshaft bearing lubrication passage, and a piston ring lubrication passage. The fluid passages are formed by continuous metal walls in contact with and surrounded by the block material. At least one of the fluid passages is curved.

According to another embodiment, a component is provided with a body defining at least one internal fluid passage configured to deliver pressurized lubricant to a rotating bearing. The fluid passage is lined by a metal wall providing a barrier between the fluid passage and the body. The metal wall of the fluid passage provides a continuous curved shape for the fluid passage, and provides a smooth tapered section for a change in effective diameter of the passage.

According to yet another embodiment, a method of forming a component with an internal pressurized lubrication circuit is provided. A lost core insert is positioned in a tool, and is shaped to form a lubrication circuit. The lost core insert has a lost core material generally encapsulated in a continuous metal shell, and has at least one curved section. Material is provided into the tool to form a body surrounding the lost core insert thereby forming a component preform.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
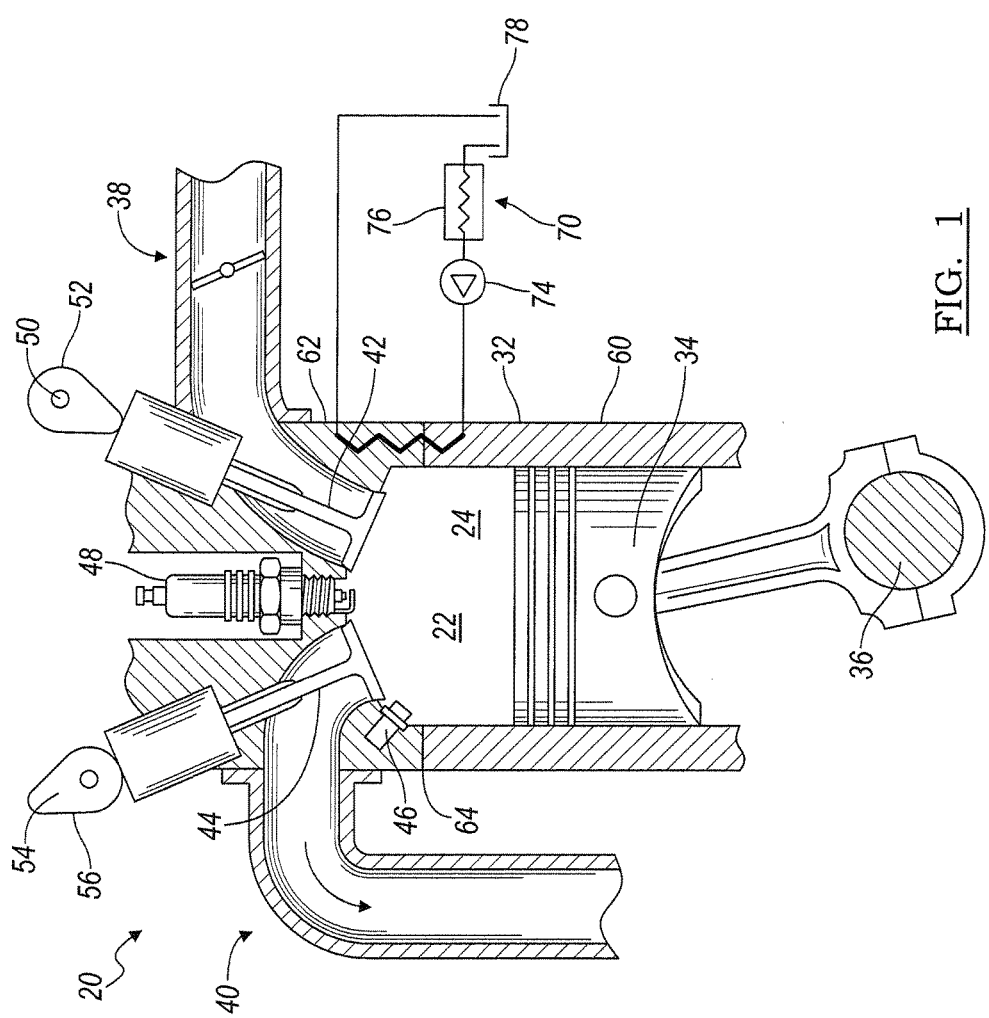
FIG. 1 illustrates a schematic of an internal combustion engine configured to implement the disclosed embodiments.

FIG. 1 illustrates a schematic of an internal combustion engine 20. The engine 20 has a plurality of cylinders 22, and one cylinder is illustrated. The engine 20 may include multiple cylinders arranged in various manners, including an inline configuration and a V-configuration. The engine 20 may be formed from a metal in a casting process. In one example, the engine 20 is formed from aluminum or an aluminum alloy in a casting process, such as a high pressure die casting process. The engine may also be formed from a composite material in a casting or molding process. In one example, the engine is formed from a composite material including up to 50% carbon fiber reinforced thermal set composite resin, with the resin being ester based or polyester based, and may be formed using a high pressure injection molding process. In other examples, the engine may be formed from another suitable material.

The engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with the intake manifold 38 and the exhaust manifold 40. One or more intake valves 42 controls flow from the intake manifold 38 into the combustion chamber 24. One or more exhaust valves 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature sensor, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 may have a cylinder block 60. A cylinder head 62 is connected to the block 60 and cooperates with the block to form the cylinders 22 and combustion chambers 24. The head 62 encloses the combustion chamber 24 and also supports the various valves 42, 44, and intake and exhaust systems 38, 40. A head gasket 64 or another sealing member may be positioned between the block 60 and the head 62 to seal the combustion chamber 24.

The engine 20 is shown as having a first camshaft 50 associated with the intake valve 42 and having a cam 52 configured to actuate the valve 42. The engine 20 also has a second camshaft 54 associated with the exhaust valve 44 and having a cam 56 configured to actuate the valve 44. The camshafts may 50, 54 may be positioned within the head 62 as dual overhead camshafts (DOHC). In alternative embodiments, the engine 20 may have only a single camshaft to control valves for a cylinder, four camshafts for an engine in a v-configuration, etc. The cams 52, 56 may be oriented at different angles relative to one another to open and close the intake and exhaust valves at different times during engine operation. Additionally, the cams 52, 56 rotational position relative to one another, or the camshafts 50, 54 rotational position relative to one another may be controlled for variable cam timing or variable valve timing.

The engine 20 includes a lubrication system 70 to lubricate various moving components of the engine 20, reduce friction and wear, and prevent overheating. The system 70 may be controlled by a lubrication system controller or the engine controller. The lubrication system 70 may be integrated into the engine 20 as described below with various passages in the block and/or head. Lubricant may flow from the cylinder block 60 to the cylinder head 62, or vice versa, or alternatively, may be independently directed to the block and the head. The lubrication system 70 may contain oil or another lubricant as the working fluid. The system 70 has one or more pumps 74, an oil cooler 76 or other heat exchanger, and a filter. The system 70 may also have a reservoir 78. The lubrication system 70 may also include valves, solenoids, bypasses, and the like, to control to flow or pressure of lubricant, or direct lubricant within the system 70 during engine operation, start-up or shut-down procedures. The oil system 70 may be a pressurized system, and may be a wet sump or a dry sump system.

The lubrication system 70 may provide lubricating fluid to various surfaces in the engine 20 that are in contact and in relative motion. For example, the lubrication system 70 may provide lubricant to various bearings including the crankshaft 36 main bearings, between the piston 34 and the cylinder 22, to the intake and exhaust valves 42, 44 and associated valvetrains, camshafts, etc. The lubrication system 70 may also provide pressurized fluid to control various engine 20 system, for example, valves, variable cam or camshaft timing controls, etc. Various portions and passages in the lubrication system 70 may be integrally formed with the engine block and/or head. Fluid passages or fluid circuits in the system 70 may be located within the cylinder block 60. Similarly, fluid passages in the system 70 may be located within the cylinder head 62. The lubrication system 70 is configured to operate at a minimum pressure to provide the required lubrication and cooling to the various engine components. By improving the flow characteristics of the lubrication system, a smaller pump may be used, and the system may operate at a higher efficiency, thereby increasing the engine efficiency and an associated fuel economy. The size, e.g. the diameter of a circular passage or effective diameter of a noncircular cross sectional passage, and the length of the passages affects the pressure, flow rate, and losses in the system 70. Likewise, the shape of the passages, e.g. the number of turns or bends in the passages, how tight the turns are, and a change in diameter, affects the pressure, flow rate, and losses in the system 70. A gradual, smooth, or continuous diameter change results in lower flow losses than a discrete or stepwise diameter change. Similarly, a smooth, curved, bend or turn results in lower flow losses than an angled turn or bend with a corner element.

As engine sizes are reduced for weight reduction, and packaging constraints become more limited, arranging the fluid passages for the lubrication system 70 within the confines of the engine may become more difficult. Additionally, losses in the system 70, such as pressure losses, may occur due to the shape and structure of passages in the system 70, as they incur sharp turns. The present disclosure provides an engine 20 with reduced losses while meeting packaging considerations, and providing for passages with complex shapes and structure.

Figure 2:
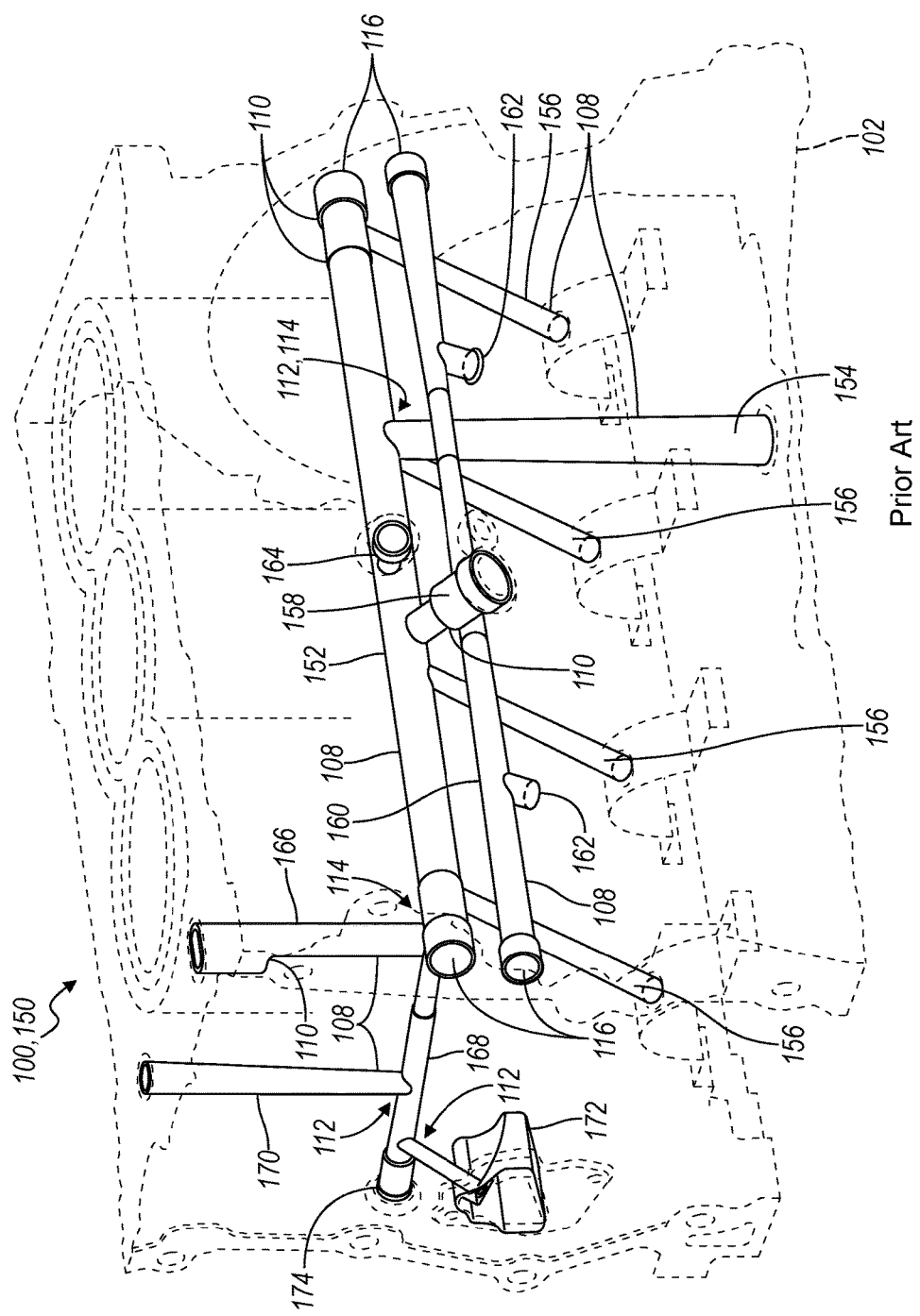
FIG. 2 illustrates an engine block having a conventional lubrication circuit.

FIG. 2 illustrates a conventional lubrication circuit 150 in a cylinder block of an internal combustion engine, such as engine 20. The lubrication circuit 150 includes various straight passages with constant diameters, and junctions between passages that have a corner, such as a right angle bend.

In one example, the block 102 is a die cast block formed using a high pressure casting process. The passages of the lubrication circuit 150 are straight passages to route lubricant through the block 102. The passages in the circuit 150 may be formed using a core pinning technique in the die or tool when the block 102 is being formed. A core pin may be used during the casting or molding process to provide additional cooling, tighter tolerancing for the formed part, and the like. The core pin creates a void within the formed part. The core pin is a straight element and is provided with a draft angle to provide for the ejection of the part off of the pin. The core pin may be used to provide an oil passage or gallery within the formed part, as the pin is already creating a void. The passage formed by the core pin may be machined after the part is formed to clean up the passage, add additional passages or flow junctions, and the like.

Alternatively, the passages in the circuit 150 may be formed by machining, e.g. drilling, the passages in the circuit 150 after the block 102 has been formed or cast. Machining involves use of a drill or similar tool, which results in a straight passage. Machining also results in a single constant diameter, or stepped diameters. Machining may limit the locations of the passages, as the block may limit where the drill or tool enters the block or passes through various regions of the block. Machining may also have a limited drilling or machining depth based on a length of the drill or tool, and issues may arise with passages not being aligned properly if the block is drilled from opposite sides to meet in a central area to form the passage.

Both of these techniques result in a straight or line of sight path to create the lubrication passages in the circuit 150. These methods do not allow for a curved passage. These methods also result in added pipe plugs and cap plugs in the ends 116 of the straight oil passages to seal the passage, turn a corner, etc., which leads to added manufacturing steps, and an increased leak potential. Although the present example is described as an engine block or crankcase, a cylinder head also uses the same conventional forming techniques and also has similar limitations.

A core pinning technique is often chosen for engine designs with limited packaging space. The set cores used need to be very robust to survive the high pressures in the manufacturing, or high pressure die casting, of the engine, and require thicker cross sections that are hard to package. The draft angles on the core pins are a function of length of the core pin, and this leads to a larger than desired sealing feature at the ends of the oil circuit 150. The conventional manufacturing techniques available for oil lubrication circuits are straight and cannot be curved for high pressure die cast parts and for composite parts. These passages are also straight due to the die cast process.

The core pin may be removed from the casting in the same direction as the die pull or may be a different direction compared to the die pull, e.g. angled relative to the die pull. The process may use one or more core pins for the process. In one example, a core pin may be approximately 100 cm in length, with a base diameter of approximately 10 mm and a tip diameter of approximately 7 mm. Extra length may be needed for the core pin due to movement during the casting process, and for the pin as described, may be approximately 3-5 mm. In other example, the core pin(s) may have other dimensions as required by the location and passage size, and may be as small as approximately 5 mm in diameter, with an associated length of 10 mm. The passage formed by the core pin has a tolerance of approximately +/−1 mm. Any core pin used in the casting process requires draft, or a draft angle, to allow for removal of the pin after the casting solidifies. The process and system according to the present disclosure eliminates the draft associated with the resulting passages, as there is no pin for removal. Also, the present disclosure eliminates extra tolerances used to compensate for pin movements, e.g. when the pin is long with a small diameter, as the aluminum overmolded salt core is used as a rigid structure during the casting process to eliminate and/or reduce core movement.

FIG. 2 illustrates straight sections of passages 108, discrete or stepped diameter changes 110, sharp angular turns 112 with corner elements, and junctions 114 formed by angular intersections of passages. These features provide limited packaging and/or increased flow losses. The ends 116 of the passages interest an outer face of the block 102, and therefore must be capped with a cap or plug to contain the fluid in the lubrication circuit during use.

The lubrication circuit 150 that is formed by the insert 100 has a main oil gallery 152 that receives filtered fluid from a pump through passage 154. Fluid in the main gallery 152 flows through passages 156 to lubricate the main bearings for the crankshaft. Fluid in the main gallery 152 also flows through a junction 158 to a secondary gallery 160, and to passages 162 that provide pressurized lubrication to the piston rings. The junction 158 may be fitted with a solenoid or another element to control the flow of pressurized fluid to the piston rings.

The main gallery 152 has a port 164 that may be fitted with a solenoid or another similar element that allows fluid flow to return to the pump, thereby providing a high volume/low volume control for the system.

A passage 166 is connected to the main gallery 152 and provides pressurized fluid to the cylinder head, and particularly to control the variable valve timing, e.g. variable cam control, or the like.

Another passage 168 receives fluid from the main gallery 152. A passage 170 is connected to the passage 168 and provides pressurized fluid to the cylinder head, and particularly to lubricate the bearings of the camshaft. A chain tensioner body 172 is also fluidly connected to the passage 168 and acts to lubricate the timing chain for the engine. A lubricant feed 174 is also connected to the passage 168 and provides lubricant to a turbocharger.

Figure 3:
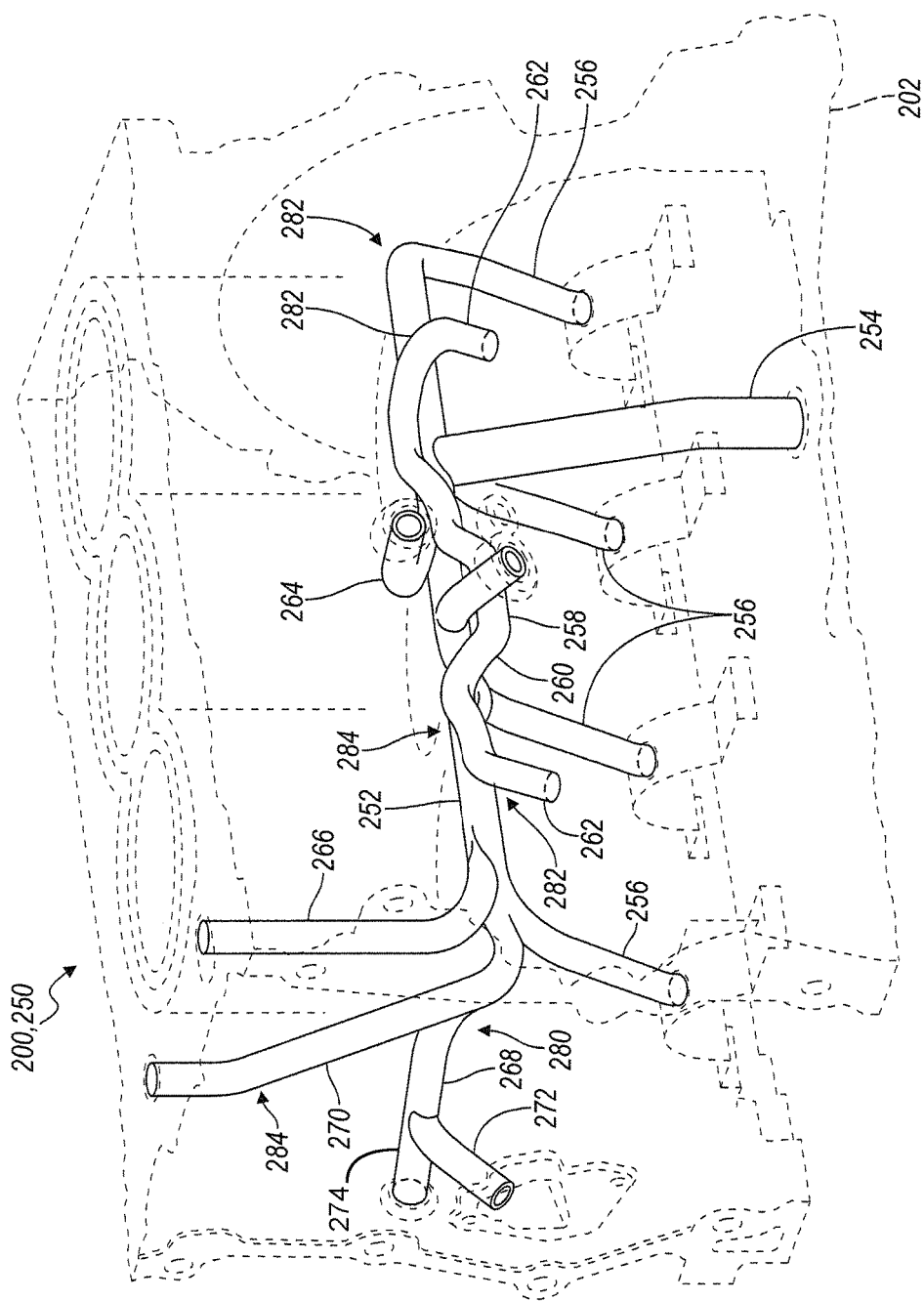
FIG. 3 illustrates an insert for an oil circuit in an engine block according to an embodiment.

FIG. 3 illustrates an insert 200 for an oil lubrication circuit 250 according to an embodiment. A block 202 is illustrated in broken lines for reference. The insert 200 may be used with a cylinder head in a manner similar to that described below for the block. An insert according to the present disclosure may also be used to form lubrication passages or circuits within various components, including cylinder blocks, cylinder heads, transmissions, generators, crankshafts, connecting rods, or other components requiring internal lubrication passages, such as machinery with pressure lubricated bearings. The lubrication passages may be formed with complex shapes and structures, as described herein, and are formed at the time the component is cast, molded, or the like as a net shape that does not require further machining or processing.

The block 202 may be formed from a metal, for example aluminum or an aluminum alloy in a high pressure die casting process. Alternatively, the block 202 may be formed from a plastic, nylon, or composite material to provide a "composite" block. The composite material may include up to 50% carbon fiber reinforced thermal set composite resin, with the resin being ester-based or polyester-based. In other examples, other fiber, particle, or materials may be used in conjunction with a resin. The composite material may have a uniform composition, or may be made with a non-uniform composition.

The block 202 is illustrated for use with an in-line, three cylinder engine, although other configurations are also contemplated. The block 202 is formed as an integral final piece that requires minimal post-processing, such as machining, particularly for lubrication passages, for example, in a near-net or net casting or molding process.

A lubrication circuit is provided within the block by the insert 200. For comparison purposes, the block illustrated in FIGS. 2 and 3 is substantially identical with the exception of the lubrication circuits. The lubrication circuits as illustrated in FIGS. 2 and 3 provide pressurized lubricant or oil to the same ports or end points for further comparison of the difference in structure.

The lubrication circuit 250 that is formed by the insert 200 has a main oil gallery 252 that receives filtered fluid from a pump through passage 254. Fluid in the main gallery 252 flows through passages 256 to lubricate the main bearings for the crankshaft. Fluid in the main gallery 252 also flows through a junction 258 to a secondary gallery 260, and to passages 262 that provide pressurized lubrication to the piston rings. The junction 258 may be fitted with a solenoid or another element to control the flow of pressurized fluid to the piston rings.

The main gallery 252 has a port 264 that may be fitted with a solenoid or another similar element that allows fluid flow to return to the pump, thereby providing a high volume/low volume control for the system.

A passage 266 is connected to the main gallery 252 and provides pressurized fluid to the cylinder head, and particularly to control the variable valve timing, e.g. variable cam control, or the like.

Another passage 268 receives fluid from the main gallery 252. A passage 270 is connected to the passage 268 and provides pressurized fluid to the cylinder head, and particularly to lubricate the bearings of the camshaft. A chain tensioner body 272 is fluidly connected to the passage 268 and acts to lubricate the timing chain for the engine. A lubricant feed 274 is also connected to the passage 268 and provides lubricant to a turbocharger.

Note that the insert is provided with shapes to minimize flow disturbances. For example, fluid junctions are provided as y-shaped junctions, such as junction 280. Fluid passages may have a continuously tapering cross section, such as passage 254. Various turns are made using a smooth curved structure, such as curves 282. The curves 282 may have no greater than a ninety degree bend, and may include a radius of curvature that is several times larger than a diameter of the passage. The insert may have slight curves or bends to better package the passages within the constraints of the component, e.g. the block, for example in regions 284.

Additionally, although the insert 200 is illustrated with circular cross sections, other cross sections are also contemplated, including elliptical, ovoid, hexagonal, octagonal, shapes that include convex and concave regions, e.g. a kidney bean shape, and other regular and irregular shapes. The cross sectional shape of the insert 200 may be the same of the entire insert or vary at different locations within the insert. Additionally, the cross sectional shapes within the insert have an effective diameter or cross sectional area that may increase or decrease in various regions of the insert, for example, as a increasing or decreasing tapered section. Changing cross sectional areas may be provided as gradual, continuous changes, or without any steps or discontinuities, to reduce flow losses in the fluid circuit.

Also note that the use of the insert 200 eliminates various plugs or end caps that are present in the conventional system as illustrated in FIG. 2. This improves the integrity of the system by reducing locations where fluid leaks are possible. It also increases the manufacturability, as it reduces the number of steps and processes for forming a finished component such as an engine block.

Figure 4:
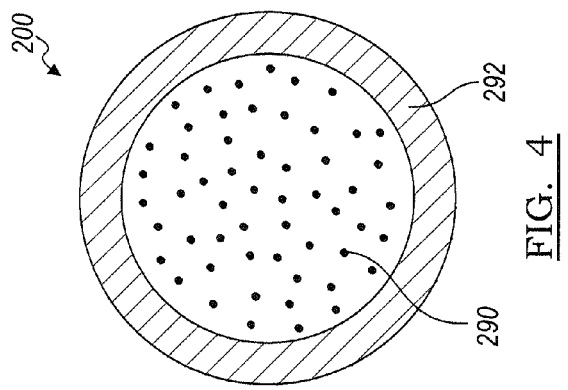
FIG. 4 illustrates a partial sectional view of the insert of FIG. 3.

FIG. 4 illustrates a partial sectional view of the insert 200 according to an embodiment. The insert is formed from a lost core material 290 that is encapsulated by a metal shell 292.

Figure 5:
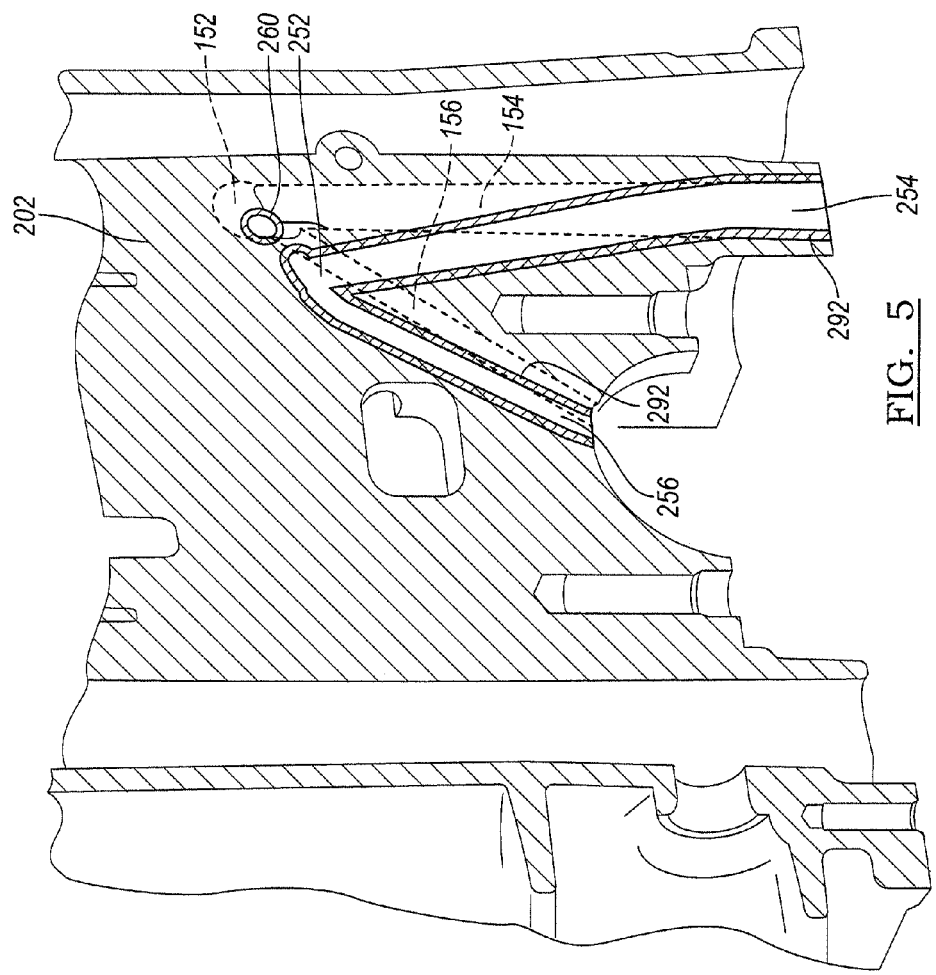
FIG. 5 illustrates a sectional view of an engine block formed using the insert of FIG. 3.

FIG. 5 illustrates a sectional view of the block 202 and passages formed by the insert 200. The inlet passage 254 provides fluid flow to the main gallery 252, and then to a fluid passage 256 that directs lubricant to a main bearing of a crankshaft. A passage 262 for lubricating a piston ring is also illustrated in the sectional view. As can be seen from the Figure, the passages 252, 254, 256 have various curves and complex shapes, and sections of the passages are formed by a continuously tapering structure.

The metal shell 292 lines each passage after the removal of the lost core material, such that the fluid passages have a metal wall or metal lining that is positioned between the open void provided by the passage itself, and the structure of the outer member 202. The metal in the lining may be aluminum or an aluminum alloy.

The metal shell 292 may act as a thermally conductive pathway, and may also aid in fluid containment within the component. For example, the metal shell 292 may prevent lubricant from wicking or flowing into the surrounding block material, and may also prevent any fluids within the block from flowing into the passages and mixing with the lubricant. This may be of particular interest when the block is formed from a porous material, such as a composite or fiber reinforced composite.

The passages formed for the lubrication circuit are illustrated in broken lines for comparison purposes. As can be seen from the Figure, the passages 152, 154, 156 are linear or straight, and have sections with constant diameters. The passages 152, 154, 156 are formed using line-of-sight processes, such as machining, and therefore their location within the block is limited.

Figure 6:
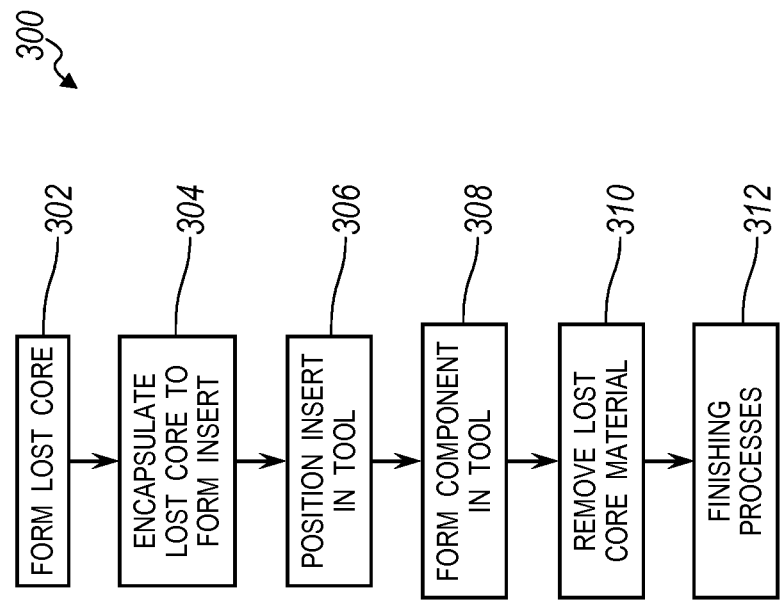
FIG. 6 illustrates a flow chart of a method of forming the engine block of FIG. 5.

FIG. 6 illustrates a flow chart for a process or a method 300 for forming a component with a lubrication circuit using an insert, where passages in the lubrication circuit are provided as a net shape when the component is formed. The process is described for an engine block, such as block 202 with lubrication circuit 250 formed by an insert 200; however, the process may be implemented with other components with internally formed lubrication passages and circuits. Various embodiments of the method 300 may include greater or fewer steps, and the steps may be performed in another order than illustrated.

At step 302, the lost core insert 200 is formed before use with the tool to form the component. To form the insert, the lost core material 290 is formed in the desired shape and size, for example, a casting or molding process with the lost core material in the shapes of the negative space of the passages. The lost core material 290 may be formed as a single integral component, or may be formed as multiple components or subsets and then joined together, for example, using a water soluble adhesive material. The use of multiple subsets may allow the overall shape of the insert 200 to more complex. The lost core material may be formed into the desired shape using a casting or molding process. In other examples, the lost core material may be formed into the desired shape using a three dimensional printing technique.

At step 304, the shell 292 is then provided around the core 290. In one example, a die casting or casting process is used to form the shell 292 while maintaining the integrity of the core 290. A die, mold, or tool may be provided with the shape of the insert 200. The core 290 or connected subsets of cores is positioned within the die, and the shell 292 is cast or otherwise formed around the core 290. The shell 292 may be formed by a low pressure casting process by injecting molten metal or another material into the mold. The molten metal may be injected at a low pressure between 2-10 psi, 2-5 psi, using a gravity feed, or another similar low pressure range. The material used to form the shell 292 may be aluminum or an aluminum alloy, and if the outer member or block 202 is formed from a metal material, may be the same metal or metal alloy as used to die cast the component. By providing the molten metal at a low pressure, the lost core 290 is retained within the shell 292. By casting the shell 292 as a single component about the lost core(s) 290, the shell 292 does not have stress points or other weaknesses that would be created by a manufacturing process, and the shell 292 maintains integrity later during the formation of the component 202. After the shell 292 cools, the insert 200 is ejected from the tool.

Other conventional solutions exist for lost core inserts, and include welding or otherwise connecting sections of metal tubes together, with the metal tubes filled with a lost core material. The connecting techniques, e.g. welding, provide stress points within the insert such that the insert metal shell may not maintain integrity during the forming process of the component, and component material may breach the metal tube walls and flow into and at least partially impede the passageway. Additionally, the shapes and structures that may be formed using the metal tubes are limited, as they are circular and have a fixed diameter. Additionally, forming the inserts using the tubes is labor and time intensive, as the tubes must be cut, bent or otherwise formed into the desired shapes, and then welded together.

At step 306, the lost core insert 200 is positioned within the tool or mold for forming the component, such as block 202. The insert 200 may have various locating features that cooperate with the dies of the tool to position and align the insert within the tool. Other additional inserts may also be provided and arranged within the tool, for example, lost core inserts for forming the cooling jacket passages, structural inserts for bulkheads, and the like. Other inserts may be formed from a lost core material alone, or may have a lost core material encapsulated by a metal shell as described herein.

At step 308, the component is formed in the tool and around the insert 200. The component may be formed from a metal, metal alloy, plastic, nylon, composite, fiber reinforced composite or other material. The component likewise may be formed using a variety of techniques, including: sand casting, low pressure die casting, high pressure die casting, semi-permanent molding, compression molding, injection molding, and the like. The tool is provided according to the manufacturing technique for the component, and may include various dies, molds, slides, cover dies and ejector dies that cooperate to form a mold cavity with surfaces shaped to form various features of the component.

In one example, the component or the block 202 is formed using a high pressure die casting process by injecting molten metal into the tool. The molten metal may be aluminum, an aluminum alloy, or another suitable material. The molten metal is injected at a high pressure, i.e. 20,000 psi, to form the engine component. The molten metal may be injected at a pressure greater than or less than 20,000 psi, for example, in the range of 15000-30000 psi, and may be based on the metal or metal alloy in use, the shape of the mold cavity, and other considerations. The shell 292 of the lost core insert 200 may be partially melted to meld with the injected metal and integrate with the outer member 202. The casting skin and shell form the walls of the lubrication circuit 250 in the block 202. The molten metal flows around the metal shell 292 of the insert and forms a casting skin with the metal shell. The casting skin provides for an improved fluid barrier without voids or other imperfections. The metal skin protects the lost core material during the casting process, such that the lost core material remains within the component. The insert 200 structure allows for the lost core material to have small dimensions and features to that remain intact during the casting process, and that would otherwise be destroyed or unavailable in a conventional lost core high pressure die casting process. The molten metal cools to form the component 202.

In another example, the component or the block 202 is formed using an injection molding process by injecting a composite mixture or material into the tool. The composite material flows around and forms an interface and/or bond with the shell 292 of the insert 200. During the molding process, the component may self-cure via a thermal set process, or an autoclave or the like may be used to cure the composite material. The molding process can be of an injection mold or compression mold both being thermal set at time of production.

By providing the shell 292, the lost core 290 remains intact for later processing to form the passages in the lubrication circuit 250. The shell 292 allows for smaller dimensioned passages, and the use of surface features that would otherwise be unavailable with a high pressure forming process, as the lost core material may not retain its shape during the process. For example, the lost core insert 200 may provide for passages or features within the lubrication circuit 250 on the order of millimeters, with passages being less than 10 mm, 5 mm, or 2 mm in size, and surface features on the order of 1 mm in resolution. Conventional lost material casting or sand casting is unable to resolve surface features or passages with these dimensions for a high pressure forming process, as the lost core material at this scale may be destroyed.

At the end of step 308, the component is removed from the tool as an unfinished component or preform.

At step 310, the unfinished component or preform is post-processed to remove the lost core material 290 from the preform. The lost core material 290 of the insert 200 remains in the component throughout the formation process in the tool, and needs to be removed. In one example, the lost core 290 is removed to form the passages in the circuit 250. The lost core 290 may be removed using pressurized fluid, such as a high pressure water jet. In other examples, the lost core 290 may be removed using other techniques as are known in the art. The lost core 290 is called a lost core in the present disclosure based on the ability to remove the core in a post die casting or post molding process. The lost core in the present disclosure remains intact during the die casting or molding process due to the shell 292 surrounding and protecting it.

At step 312, other post-processing machining or manufacturing steps may also be conducted. For example, minimal machining may be conducted for the lubrication circuit 250 for the solenoid controls or similar features. Additionally, other component machining or finishing may be conducted, for example, by milling the deck face for the engine block 202. Additional passages or ports may be provided by additional finishing or machining after molding or casting in some embodiments.

After the component 202 has been post-processed, the engine 20 may be assembled by connecting the cylinder head to the block, and the engine 20 may be placed into a vehicle.

The passages for the lubrication circuit 250 may be formed in the component 202 by one or more inserts, including lost core inserts, during the manufacturing process as described above with reference to FIGS. 3-6. Insert 200 is illustrated as the insert to form fluid passages in a lubrication circuit 250. The insert 200 is formed before use with the tool to form the component. The insert 200 includes a lost core region 290. The lost core 290 may be a salt core, a sand core, a glass core, a foam core, or another lost core material as appropriate. A shell 292 surrounds or encapsulates the lost core 290 such that it covers at least a portion of the outer surface of the lost core 290. The shell 292 may be formed from a metal, including aluminum or an aluminum alloy. The core 290 is provided generally in the desired shape and size of a portion of fluid passage, or substantially all of a passage. In the example shown, the lost core 290 forms the shape of a fluid passage for the lubrication circuit in the block 202.

A lubrication circuit 250 is formed within the component or block 202. The lubrication circuit 250 is formed by a series of interconnected fluid passages that direct pressurized lubricant to various regions of the component for lubrication and/or thermal management. The lubrication circuit 250 is formed by the insert 200. The lost core material 290 is surrounding or encapsulated by the thin-walled metal shell 292. The lost core material 290 may be provided with various curved shapes and structures, and smooth changes in cross sectional area and direction to provide for reduced flow losses. The thin-walled metal shell 292 may be on the order of millimeters in thickness. The shell 292 remains in the component 202 after the lost core material 290 is removed, such that the shell 292 lines the passages of the lubrication circuit 250.

The shell 292 is provided as a barrier between lubricant in the circuit 250 and the material of the component 202, and prevents lubricant from entering the material of the component 202 as well as and fluids in the component 202, e.g. coolant or water, from entering the lubricant circuit 250 and mixing with the lubricant. An component made from a composite material, e.g. a carbon fiber resin composite, has a degree of porosity due to the fibers, as well as any voids or imperfections formed during the molding process. As such, the shell 292 acts as a liner to prevent leakage or fluid transport into the component 202 and vice versa.

The shell 292 also acts to enhance heat transfer between the component 202 and the fluids in the lubrication circuit 250. A component made from a composite material, e.g. a carbon fiber resin composite, has a much lower thermal conductivity than the metal shell. As such, the shell 292 acts as a thermal conduit and enhances heat transfer to the lubricant to more effectively and efficiently thermally stabilize or cool the component 202 during operation. In a further example, the outer shell 292 may be provided with various surface features on the inner wall in contact with the fluid, or on the outer wall in contact with the component 202 to enhance heat transfer by increasing the surface area and/or creating desired flow patterns, e.g. fins, vortex or swirl inducing features, various surface roughnesses, and the like.

Various embodiments of the present disclosure have associated, non-limiting advantages. For example, a compact lubrication circuit is may be used to reduce packaging space required to achieve flow requirements. A unique contoured lubrication circuit is provided that has the ability to wrap tightly to the functional features that otherwise limit the placement. An insert is provided with a self-contained hollow aluminum shell that acts as a transport for the lubricant. The insert contains a lost core material during the formation of the component. This shell can contain multiple bends and intersections to enable complex routing for the lubricant passages. In an internal combustion engine, the cylinder block or cylinder head has a priority to the sub-systems requiring high pressure oil to maintain function. The insert according to the present disclosure provides a compact and optimized lubrication circuit that enables thinner or smaller than traditional fluid passages and reduced machining steps. The insert that defines the oil circuit provides a tight package to nest around the functional features. Additionally, the insert provides for complex shapes and structures, such as passageways that are curved and have multiple smooth intersections or junctions during the formation process for the component, thereby minimizing additional manufacturing steps. The lubrication circuit may be formed to both fit within limited packaging space, and also has reduced pressure drops and improved flow characteristics due to the smooth, contoured shape. The lubrication circuit therefore may have improved flow efficiency, leading to increased pump efficiency and overall fuel economy.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of forming an internal pressurized lubrication circuit in a component, the method comprising:
    shaping a lost core material to form an internal pressurized lubrication circuit by shaping three sections with each section having a smooth tapered shape with a continuously changing effective diameter without a step discontinuity to form a respective passage in the lubrication circuit, at least one of the sections shaped to be curved with a radius of curvature of more than twice a largest diameter of the section, and connecting the three sections to one another using a y-shaped junction;
    forming a lost core insert in a first tool by encapsulating the three sections and the y-shaped junction of the lost core material with a continuous metal shell;
    positioning the lost core insert in a second tool;
    forming a component preform by providing material into the second tool to form a body surrounding the lost core insert; and
    removing the lost core material from the preform with the shell remaining to define fluid passages in the lubrication circuit of the component;
    wherein the steps of forming the lost core insert, positioning the lost core insert, forming the component preform, and removing the lost core material are performed sequentially.

2. The method of claim 1 wherein providing material further comprises injection molding a composite material.

3. The method of claim 1 wherein providing material further comprises casting a metal including aluminum in a high pressure die casting process.

4. The method of claim 1 wherein shaping the lost core material includes shaping the y-shaped junction to minimize a pressure drop prior to encapsulating the lost core material in the metal shell.

5. The method of claim 1 wherein each of the three sections of the lost core material are shaped using three dimensional printing.

6. The method of claim 1 wherein the three sections of the lost core material are shaped as separate lost core material subsets and are joined to one another prior to encapsulating the lost core material in the metal shell.

7. The method of claim 1 wherein the lost core insert is formed by die casting the metal shell about the lost core material in the first tool to form the insert by injecting molten metal at a pressure of less than 10 psi, wherein the molten metal comprises aluminum.

8. The method of claim 1 further comprising forming the tool with a surface shaped to define one of a cylinder block and a cylinder head for an internal combustion engine.

9. The method of claim 1 wherein the lost core material is shaped with a smooth curved structure connecting two sections to form a turn in the lubrication circuit, the curved structure having a radius of curvature that is at least twice a diameter of the two sections.

10. The method of claim 1 wherein the fluid passages in the lubrication circuit each have an effective diameter of less than ten millimeters.

11. A method of forming a pressurized lubrication circuit in an engine component, the method comprising, sequentially:
shaping a lost core material to provide fluid passages of the pressurized lubrication circuit by shaping three sections joining at a y-shaped junction, each section having a smooth tapered shape with a continuously changing effective diameter and without a step discontinuity, one section being curved with a radius of curvature at least twice a largest diameter of the section;

positioning the lost core material into a first tool;
forming an insert by injecting aluminum into the first tool to form a continuous cast-on shell encapsulating the lost core material;
positioning the insert into a second tool;
forming a component preform by die casting material into the second tool to surround the insert; and
removing the lost core material from the preform with the shell remaining to define fluid passages of the pressurized lubrication circuit of the engine component.

12. The method of claim 11 wherein the insert is formed by die casting and injecting molten aluminum at a first pressure to form the shell around the lost core material in the first tool; and
wherein the component preform is formed by die casting a metal including aluminum at a second pressure into the second tool to surround the insert, the second pressure greater than the first pressure.

13. The method of claim 11 wherein the shell provides a liner for the fluid passages in the lubrication circuit in the engine component for lubricant containment within the fluid passages.

14. The method of claim 11 wherein the lost core material is shaped to provide an entirety of the pressurized lubrication circuit in the engine component.

* * * * *